T. M. FOOTE.
RECORDING DEVICE.
APPLICATION FILED DEC. 26, 1903.

997,983.

Patented July 18, 1911.

WITNESSES:

INVENTOR

BY

ATTORNEYS

T. M. FOOTE.
RECORDING DEVICE.
APPLICATION FILED DEC. 26, 1903.

997,983.

Patented July 18, 1911.

T. M. FOOTE.
RECORDING DEVICE.
APPLICATION FILED DEC. 26, 1903.

997,983.

Patented July 18, 1911.
4 SHEETS—SHEET 3.

UNITED STATES PATENT OFFICE.

THEODORE M. FOOTE, OF NEW YORK, N. Y., ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

RECORDING DEVICE.

997,983.

Specification of Letters Patent.

Patented July 18, 1911.

Application filed December 26, 1903. Serial No. 186,570.

*To all whom it may concern:*

Be it known that I, THEODORE M. FOOTE, a citizen of the United States, and a resident of the borough of Brooklyn, city and State of New York, have invented certain new and useful Improvements in Recording Devices, of which the following is a specification.

This invention relates to improvements in recording or accounting devices, and particularly to means for recording or effecting an accounting of the operation of cash registering apparatus or the like located at a distance.

Cash registers as commonly employed at the present day are employed for the purpose of indicating, or registering, or recording, or for performing any two or all of these operations; and in carrying out the present invention, means for securing an accounting at a distance, of the operations of such a cash register are provided, so that by this means there is obtained at a distant point structurally separate from the cash register a registration or printing or analogous entry of the various transactions registered, recorded or indicated upon the cash register itself. It is therefore one of the objects of the invention to secure at a point distant and structurally separate from the cash register, an accounting of the various transactions entered upon the cash register, whereby the business transactions of a number of places may by this means all be recorded in one central office, thereby centralizing the direction of a business having many departments or branches.

With these and incidental objects in view, the invention consists in certain novel features of construction and combinations of parts, the essential elements of which are set forth in appended claims, and a preferred form of embodiment of which is hereinafter specifically described with reference to the drawings which accompany and form part of this specification.

Of the accompanying drawings.

In general terms the present improvements comprise circuit controlling devices forming part of a cash register and controlling different electrical circuits for different amounts corresponding to the desired value of the transaction, and these electrical circuits control the operation of the distant accounting device, with the further provision that the main operative movement of the distant accounting devices is controlled by some movable part of the cash register, such as the main driving mechanism therefor. These particular improvements are shown more particularly as applied to the kind of cash register known upon the market as the "Hallwood" machine, this machine being shown as to its general features and principle of operation in patents to Henry S. Hallwood, Nos. 704,795 and 704,796, both dated July 15, 1902, and the attachment of printing elements therefor being shown in English patent to Henry S. Hallwood, No. 4543 of Feb. 26, 1903, although it will of course be understood that these inventions are just as applicable to any of the various forms of cash registers now upon the market. In this Hallwood type of machine a series of keys are provided which when depressed according to the amount of the transaction predetermine the setting positions of certain differential devices in the cash register, and in the present improvements these differential devices are utilized as circuit controlling devices; and when the cash drawer of the machine is opened, these differential devices assume their set positions and then are restored to normal position upon the closing of the cash drawer, at which time the registration takes place in the cash register, and an indication and printing of the amount of the transaction ensues as an accompaniment thereof. Of course it will be understood that any desired elements of the cash register may be used as such circuit controlling devices so long as they are of such nature as to control different circuits according to the different amounts of the various transactions. The movable cash drawer in the present improvements is also utilized to close a circuit through the motor for effecting the actuation of the distant accounting devices after the circuit controlling devices in the cash register itself have been operated so as to predetermine what the corresponding extent of movement of the distant accounting devices shall be.

Referring now to the drawings for a more specific description of the precise construction which has been adopted to carry out the general objects of this invention, D (Figs. 1, and 2) designates a suitable base and $d$ standards extending upward from said base.

Figures 1, 2, 3:
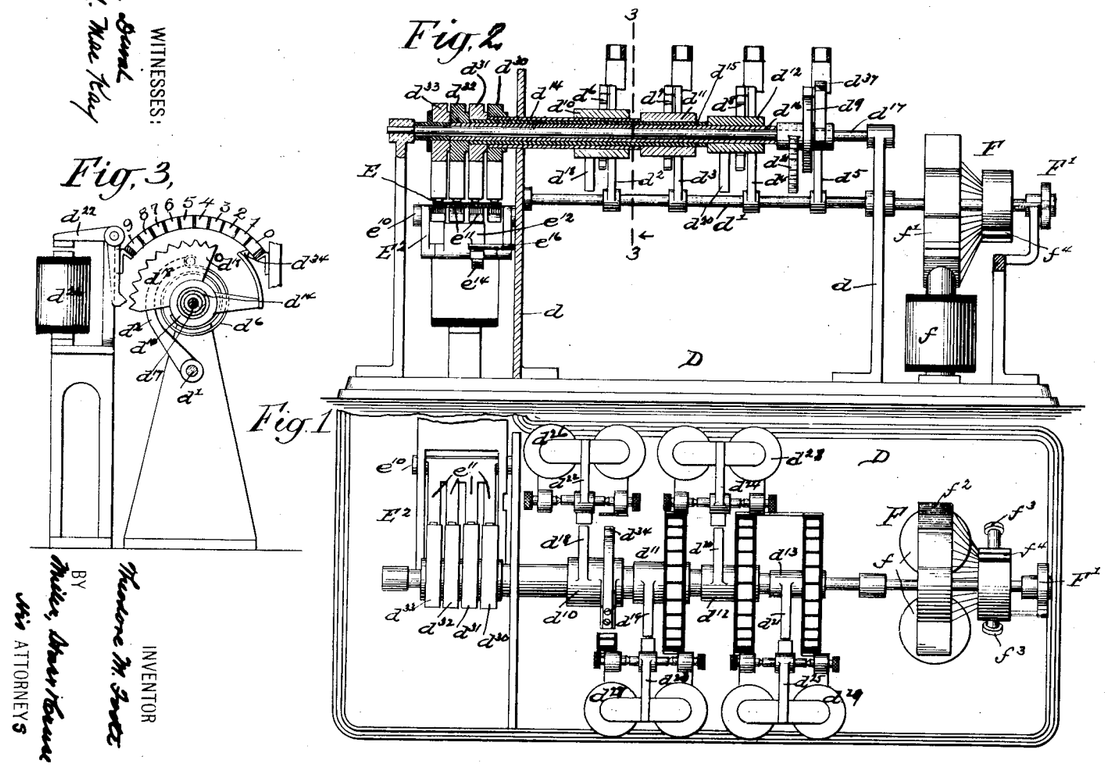
Figure 1 represents a top plan view of that portion of the invention embodying the recording device at the distant point.
Fig. 2 is a vertical sectional view of the same.
Fig. 3 is a transverse sectional view taken on the line 3—3 of Fig. 2.

$d^1$ designates a shaft which is suitably journaled in the standards $d$ and is adapted to be rotated or oscillated in opposite directions as will hereinafter be explained.

$d^2$, $d^3$, $d^4$ and $d^5$ designate arms or levers carried by the shaft $d$ and they are adapted, upon the rotation of the shaft $d^1$ to cause a rotation of shafts $d^{14}$, $d^{15}$, $d^{16}$, $d^{17}$, which carry the devices from which a record may be obtained. The shaft $d^{17}$ is suitably journaled in the standards $d$ and the other shafts are shown as being arranged one within the other and upon the shaft $d^{17}$. The arrangement is such that the several shafts may have independent rotation. More or less than four shafts may be thus arranged. Any other arrangement permitting of independent rotation of the several shafts may be employed.

$d^6$, $d^7$, $d^8$, $d^9$ designate coiled springs having one of their ends secured to the arms $d^2$, $d^3$, etc., and their other ends preferably to collars $d^{10}$, $d^{11}$, $d^{12}$, $d^{13}$ which are fixed upon the shafts $d^{14}$, $d^{15}$, $d^{16}$, $d^{17}$ respectively. It will be seen therefore that upon a rotation or oscillation of the shaft $d^1$, a corresponding rotation will be given to the shafts $d^{14}$, $d^{15}$, $d^{16}$, $d^{17}$ through the arms and springs. Any other means may be employed between the shafts $d^1$ and the shafts $d^{14}$, $d^{15}$, $d^{16}$ and $d^{17}$ for rotating these shafts from the shaft $d^1$. Also separate motors may be employed for each shaft $d^{14}$, $d^{15}$, $d^{16}$ and $d^{17}$.

$d^{18}$, $d^{19}$, $d^{20}$, $d^{21}$, designate toothed segments which are preferably carried by the collars $d^{10}$, $d^{11}$ &c., respectively. Coacting with these toothed segments, or they may be toothed wheels, are electromagnetically operated devices, which devices are adapted upon the exciting of their electromagnets to prevent or limit the rotation of the shafts by engaging the toothed segments. As here shown these devices consist of bell-crank levers $d^{22}$, $d^{23}$, $d^{24}$, $d^{25}$, one for each segment, and each having a projection for engaging the segment, and an armature. Electromagnets $d^{26}$, $d^{27}$, $d^{28}$, $d^{29}$ are provided for the bell crank levers $d^{22}$, $d^{23}$, etc., respectively. For each recording device, of which there may be any number, there is provided a shaft, a toothed segment and electromagnetically actuated means for engaging the segments to limit or prevent the rotation of the shaft, and to hold the shaft fixed and consequently the recording device, so that a record may be obtained from it. The circuits for the electromagnets may be controlled in any desired way.

Figures 4, 5:
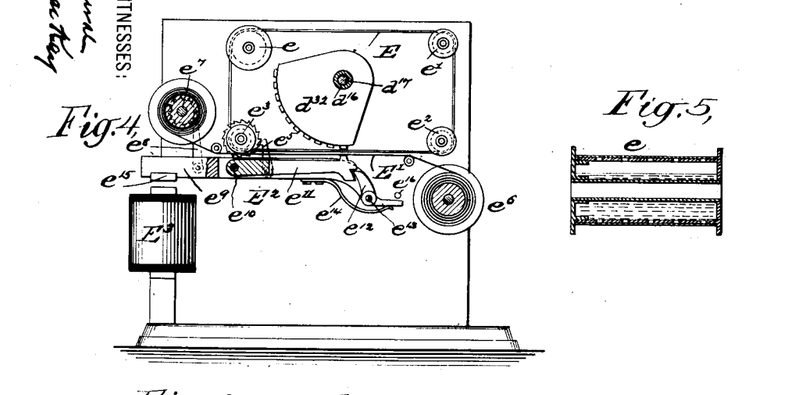
Fig. 4 is a detail vertical sectional view of the printing mechanism.
Fig. 5 is a detail sectional view of an inking roller.

$d^{30}$, $d^{31}$, $d^{32}$, $d^{33}$ designate the devices from which a record or impression may be made. As here shown, these devices are in the form of segments, though they may be circular, and as having printing surfaces with which a printing mechanism coacts. Any other means for giving a record may be employed on the devices. In Fig. 4 I have shown a printing mechanism which may be employed for obtaining a record from the devices $d^{30}$, $d^{31}$, etc. In the printing mechanism shown in this figure, E designates a printing ribbon, $E^1$ a paper strip upon which an impression is made and $E^2$ a printing platen. The ribbon passes about rollers $e$, $e^1$, $e^2$, $e^3$ one of which $e$ may be an inking roller, and another $e^3$ a feeding roller, it being provided with a ratchet which is engaged by a pawl $e^5$ carried by the platen $E^2$. The paper strip is unwound from a supply roll $e^6$ and wound upon a spool $e^7$ which is given intermittent movement from the platen through the pawl $e^8$ carried by the platen and engaging a ratchet wheel carried by the spool $e^7$. The platen $E^2$ comprises a frame $e^9$ pivoted on a pin $e^{10}$ and platen levers or projections $e^{11}$. The platen levers $e^{11}$ are pivoted at one of their ends on the pin $e^{10}$ and are supported at their other ends by the pawl $e^{12}$ pivoted on a pin $e^{13}$ and which is pressed into notches in the ends of the lever by a spring $e^{14}$. The printing platen is rocked on its pivot by means of an electromagnet $E^3$, the armature $e^{15}$ for which is carried by the frame $e^9$. When the electromagnet is energized the platen is rocked on its pivot and the levers $e^{11}$ press the paper and the ribbon against the printing segments. When the electromagnet is deënergized the platen is moved away by the springs $e^{14}$ which is put under tension by the pawl engaging pin $e^{16}$ when the platen is rocked to make an impression on the paper. The circuit for the electromagnet $E^3$ may be opened and closed in any desired manner.

The operation of the instrument so far as described is as follows: Upon the rotation of the shaft $d^1$ by any suitable form of motor, the shafts $d^{14}$, $d^{15}$, etc., will be rotated and with them the segments. If any or all of the electromagnets $d^{23}$, $d^{24}$, etc., be energized they will operate their means to engage the segments and prevent or limit the further rotation of the shafts $d^{14}$, $d^{15}$, etc., and hold them in the position in which they are stopped. If the printing segments contain numerals on their printing surfaces any combination of four figures may be obtained upon the energizing at the proper time of the electromagnets, for the notches on the segments correspond in number to the printing surfaces on the segments. Upon the rotation of the shaft $d^1$ in the opposite direction and after the electromagnets have been deënergized to release the segments, the shafts $d^{14}$, $d^{15}$, etc., will be given a corresponding opposite rotation through the arms and springs and returned to their normal position.

Figure 6:
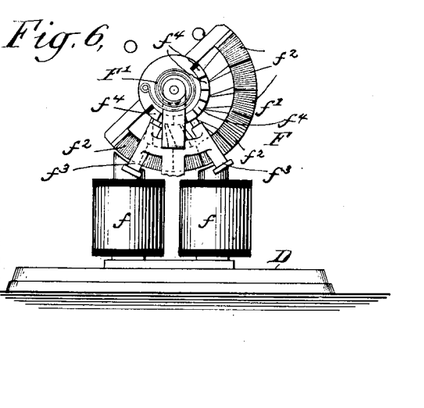
Fig. 6 is an end elevation of a form of motor employed in connection with the invention.

Any desired form of motor may be employed for rotating the shaft $d^1$ in opposite directions, or as shown in the drawings, a motor F may be employed for rotating the shaft in one direction and a coiled spring $F^1$ may be employed for rotating the shaft in the opposite direction. With this arrangement the coiled spring is put under tension during the operation of the motor F so that upon a cessation of the operation of the motor F or its effect, the coiled spring can then be permitted to act. The motor F is shown as being in the form of an electric motor, and its construction is such that a partial revolution (anything less than a complete revolution) may be obtained with a minimum amount of current. As shown the motor F comprises electromagnets $f$ constituting a field magnet, and an armature $f^1$, which is segmental in design and is fixed upon the shaft $d^1$. The armature comprises a plurality of insulated sections $f^2$ the windings of which are in series and are connected with commutator segments $f^4$ in a manner somewhat similar to the Gramme ring except that the end sections are not connected with each other.

$f^3$, $f^3$ designate brushes carried in the frame $f^5$ and they are arranged so as to include between them about three of the commutator sections. The current for the motor is supplied through one brush $f^3$, commutator section on which it rests, the windings and commutator sections between the first brush and the second brush, and from the second brush through the electromagnets $f^1$ in series. Assuming the normal position of the motor to be that shown in Fig. 6, it will be seen that the iron energized by the few windings connected with the commutator sections between the brushes is outside of the field of the electromagnets, and that its tendency is to come wholly within the field of the electromagnets. In doing so, it causes a rotation of the armature, and during the rotation new commutator sections are included between the brushes as fast as the commutator sections previously between the brushes pass from between them. It will be seen therefore that a long stroke by the rotation of the armature with a minimum amount of current may thus be obtained. During the rotation of the armature the spring $F^1$ is put under tension, and as soon as current is cut off from the motor, the spring $F^1$ uncoiling returns the armature to its original or normal position. No claim is made herein for this type of motor, as the same forms the subject matter of patent to the present applicant, Theodore M. Foote, No. 775,560, dated Nov. 22, 1904.

Figure 7:
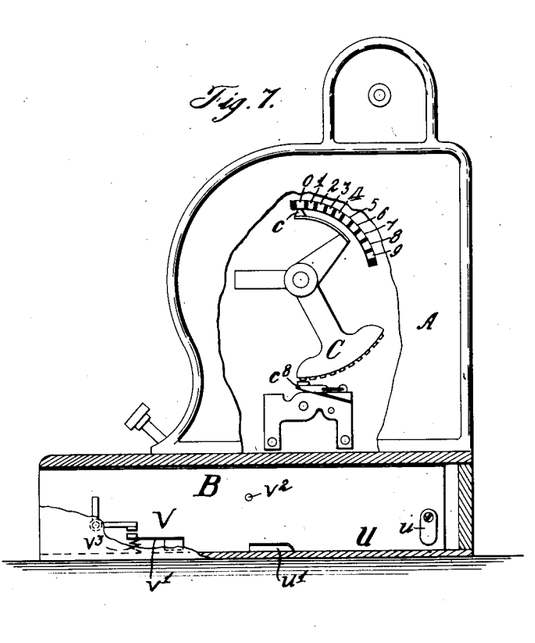
Fig. 7 is a diagrammatic view of a cash register to which this invention may be applied.
Figure 8:
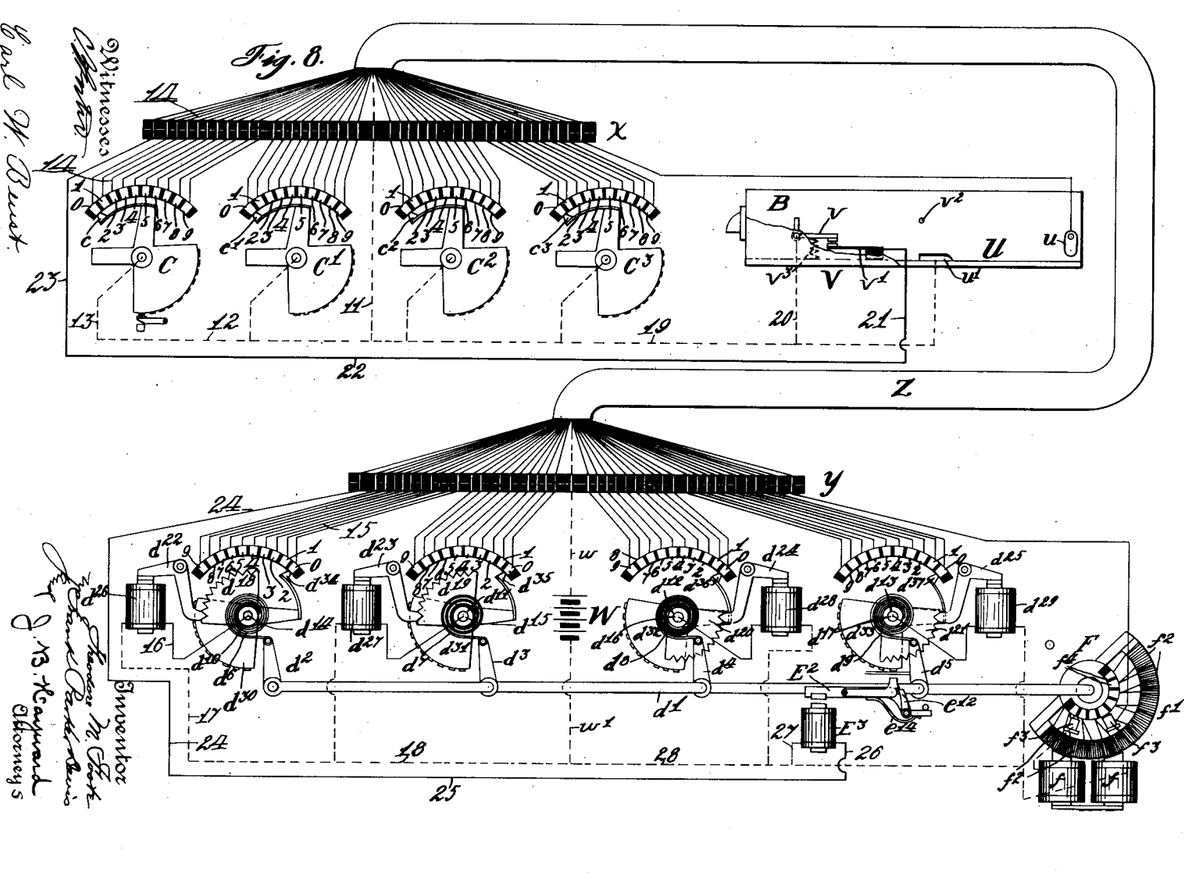
Fig. 8 is a diagrammatic view of the arrangement of circuits and various circuit controlling devices intermediate the cash register and the distant recording device.

Referring now to Fig. 7, A designates a casing of a cash register, and B a drawer which is released in any desired way, so that it may be opened, as by the depression of a key in the type of cash register hereinbefore referred to. C designates one of a number of printing segments usually provided in this type of cash register, and $c^8$ designates a printing mechanism. These printing segments are moved to their proper printing position by any desired means. The segments are provided with contacts $c$, $c^1$, $c^2$, $c^3$, which are moved with the segments. These contacts travel over a series of contact plates 0, 1, 2, 3, 4, 5, 6, 7, 8, and 9, one contact plate being provided for each printing surface on the segment. The contacts $c$, $c^1$, etc., and the series of contact plates 0, 1, 2, 3, etc., may be termed a circuit selector. In Fig. 8 I have shown four printing segments C, $C^1$, $C^2$, $C^3$. There may be more or less similar printing segments. Each printing segment is provided with a circuit selector. Of course each printing segment may have more or less printing surfaces and the printing surfaces may bear any desired indicia. One of the four segments may contain letters, signs, etc. I will assume however for convenience of description, that each segment is provided with ten figures, 0, 1, 2, 3, 4, etc. For each printing or record segment in the cash register there will be a corresponding record segment in the recording instrument. I have shown (see Fig. 8) four printing segments $d^{30}$, $d^{31}$, $d^{32}$, $d^{33}$, in the recording instrument and their printing or recording surfaces correspond with the printing or recording surfaces of the segments $C^1$, $C^2$, $C^3$, $C^4$. Each printing segment $d^{30}$, $d^{31}$, etc., is provided with a circuit selector of substantially the same form and arrangement as that employed in connection with the segment $C^1$, $C^2$, etc. As shown in Figs. 1 and 3 the collars $d^{10}$, $d^{11}$, etc., are provided with movable contacts $d^{34}$, $d^{35}$, $d^{36}$, $d^{37}$ respectively. Each contact $d^{34}$, $d^{35}$, etc., travels over contact plates 0, 1, 2, 3, 4, 5, 6, 7, 8, and 9 there being a contact plate 0, 1, 2, 3, etc., for each contact plate 0, 1, 2, 3, etc., employed in connection with the movable contacts $c$, $c^1$, etc., of the segments C, $C^1$, etc. The several series of contacts 0, 1, 2, 3, etc., of the segments C, $C^1$, etc., may be connected to contact plates in a bar X and the several series of contact plates 0, 1, 2, 3, etc., of the recording devices may be connected to contact plates in a bar Y, and the two bars X, Y may be connected by wires combined to a cable Z. W designates a battery or other source of electric current and $w$ a wire leading from one pole of the battery from which wire $w$ branches lead to the movable contacts $c$, $c^1$, $c^2$, $c^3$, and to one of the parts of the circuit controllers or switches operated by the drawer B as hereinafter described, and $w^1$ a wire leading from the other pole of the battery from which wire $w^1$ branches lead to the electromagnet $E^3$ of the recording devices, and to the motor F of the recording instrument. The drawer B operates two circuit controllers or switches, one U for closing and opening the circuit for the motor, and the other V for closing the circuit on the electromagnet of the printing mechanism.

The circuit closer U comprises a lug $u$ which when the cash drawer is near the extremity of its opening movement strikes a contact $u^1$ situated upon the framework of the machine, these contact parts $u$ and $u^1$ being suitably insulated and connected to the ends of the wires leading to the motor circuit. The circuit closer V comprises a pivoted contact piece $v$ coöperating with another contact piece $v^1$, these contact pieces being attached to the ends of the wires leading to the printer actuating magnet $E^3$. The pivoted contact piece $v$ is arranged to be struck by a pin $v^2$ carried upon the side of the drawer, which upon the outward movement of the drawer strikes the upward projecting part of the contact piece $v$ and rides freely past the same, but on the initial closing movement of the drawer strikes upon the other side of this projecting portion and forces the contact piece $v$ down upon its companion piece $v^1$ against the tension of the spring $v^3$ and thereby closes the contact through the printing magnet $E^3$ so as to cause an impression to be taken of the amount set up on the distant recording device. Any suitable full-stroke device such as is ordinarily used in the Hallwood machine may be utilized to compel a full outward and inward movement of the drawer.

The operation of this distant recording or accounting instrument in connection with the cash register will now be set forth: Assuming that the amount to be set up on the cash register is represented by the number 2 5 7 9, the keys corresponding to these separate digits in the different banks will be depressed and upon the release of the cash drawer the segments C, $C^1$, etc., will each move differentially to an extent corresponding to their respective digits and will finally come to rest with their contacts $c$, $c^1$, etc., resting upon the contact plates 2, 5, 7, 9 respectively. After the cash drawer has moved outward to such an extent as to permit the greatest possible extent of any one of the segments, the contact piece $u$ strikes the contact $u^1$ and thereby closes the circuit through the motor F which is thereupon actuated to rotate the shaft $d^1$ and with it through the arms and coiled springs rotate the shafts $d^{14}$, $d^{15}$, $d^{16}$, $d^{17}$, etc. This will cause the contacts $d^{34}$, $d^{35}$, etc., to travel over their series of contact plates and as soon as they come in contact with their respective live contact pieces 2, 5, 7, 9 respectively, they will each close the circuit through corresponding electromagnets $d^{26}$, $d^{27}$, etc., and thereby lock the segments in these positions so that the recording instrument is now set up ready to print the number 2 5 7 9. Upon the return or closing movement of the drawer the printing switch V is now actuated as above described by means of the pin $v^2$ and thereby the circuit is closed through the printing magnet $E^3$ and an impression is taken of the amounts set up in this manner upon type segments of the recording instrument; and during this time the contact piece $u$ is still in engagement with its corresponding contact piece $u^1$, but on the continued closing movement of the drawer the lug $u$ is carried off of the contact piece $u^1$ and thereby the motor circuit is broken and the restoring spring of the motor now restores the motor to normal position and of course also rotates the shaft $d^1$ reversely so as to tend to carry all of the segments $d^{18}$, $d^{19}$, etc., back toward normal zero position, and these segments are released by the unlocking of the bell crank levers $d^{22}$, $d^{23}$, etc., due to the fact that the closing movement of the cash drawer has started the return of the cash register segments C, $C^1$, &c., toward normal position, thereby removing their respective contact pieces from the contact plates upon which they previously rested and thus breaking the previously established circuits so as to permit the segments of the recording instrument to be returned to normal zero position following up the return of the cash register segments to normal zero position.

A tracing out of the actual electrical connections may be seen in the diagrammatic view shown in Fig. 8 with reference first to the electromagnet $d^{26}$; starting from the battery W the current goes through the wire $w$, then through the cable, then through the wires 11, 12 and 13 to the movable contact $c$ and then to the contact plate 2 (where the number "2" was set up as in the above example, and the segment C was moved up two units to carry its contact piece $c$ to engage the contact plate 2) and then from the contact plate 2 through the wire 14, back through the cable, through the wire 15, to the contact plate 2 of the corresponding segment of the recording instrument so that as soon as the contact $d^{34}$ has been moved by the motor F in the manner above described and reaches the contact plate 2, the circuit will continue through the contact $d^{34}$, wire 16, electromagnet $d^{26}$, and wires 17, 18 and $w^1$ back to the battery; the electromagnet $d^{26}$ being thus energized will of course operate the bell crank lever $d^{22}$ to cause it to engage the segment and positively lock the same in proper position. A similar arrangement of circuits is of course made for the other members of the recording instrument and need not be further described. The circuit for the printing switch V starts from the battery W through the wire $w$, through the cable, wires 11, 19, 20, switch V, wires 21, 22 and 23 back through the cable, wires 24, 25 and 26, electromagnet $E^3$ and wires 27, 28 and $w^1$ back to the battery.

It will be understood that the printing segments of the cash register normally stand in zero position and in such position their contact pieces rest upon the zero contact plates, and likewise the segments of the recording instrument when in normal position rest with their contact pieces engaging the zero contact plates, so that this will cause the current to be running through each of these respective circuits since the pairs of zero contact plates correspond and are connected electrically, and in this manner it is obvious that the circuits will be established through all of the electromagnets $d^{26}$, $d^{27}$, etc., when the machine is in normal condition thereby acting upon all of the bell crank levers $d^{22}$, $d^{23}$, etc., to lock the segments of the recording instrument in zero position, this normal condition being shown in Fig. 8; and thus if no key in one particular bank is operated and the segment at the cash register does not move, the corresponding segment at the recording instrument will also not move because it remains locked, and for the other and operated banks, as soon as the cash register segment begins to move its contact piece is moved off of the zero contact plate and this will of course break the circuit through the contact piece at the recording instrument and immediately unlock the segment so that it may subsequently be moved by the motor as above described until a new live contact plate is reached, this unlocked position being shown in Fig. 3. Thus the differential movements of the cash register segments control the movements of the segments of the recording instrument and impart thereto differential extents of movement exactly corresponding to the differential movement at the cash register.

It is to be noted that the control of the segments at the recording instrument may be effected not only by the differentially movable segments of the cash register but by any other means which are operated in the cash register to represent the different amounts to be set up, such for example as the keys themselves, it being only necessary to have circuit controlling devices forming part of the cash register which control different circuits for different amounts, and thereby control the extent of the accounting at the distant instrument; and furthermore the making of the motor circuit to give the actuating or setting movement to the differentially movable elements at the recording or accounting instrument may be established by any suitable moving part of the cash register.

As above stated it is not intended to confine this invention to any particular type of cash register such as the "Hallwood" since the broad features of the invention are applicable just as well to any one of the various kinds of cash registers now known or in use.

Various changes may be made in the several parts of the present improvements as well as in their relative arrangement, and in the arrangement of the circuits without departing from the spirit of the invention; and it will be understood that whenever the term "recording instrument" is used in the claims, or the word "accounting", that it is not desired to limit the invention specifically to an instrument which simply records by printing upon a tape, but on the contrary it is to be understood as referring to an instrument which makes any form of permanent registry or record, and it will be understood that the control of these differentially movable elements at the distant instrument may be utilized for other analogous purposes.

What is claimed is:

1. A machine of the character described, comprising a primary accounting device, consisting of a plurality of mechanisms arranged to be preliminarily adjusted as desired, and a distant structurally separate accounting device, consisting of a plurality of mechanisms whose movements are simultaneously controlled in extent by the primary accounting device, and means controlled by the primary accounting device for operating said distant accounting devices to the desired extent subsequent to the adjustment of said primary accounting device.

2. A machine of the character described, comprising a primary accounting device, consisting of a plurality of mechanisms arranged to be preliminarily adjusted as desired, and a distant structurally separate accounting device, consisting of a plurality of mechanisms whose movements are simultaneously controlled in extent by the primary accounting device, with means for positively limiting the extent of such movement of the distant accounting device, and means controlled by the primary accounting device for operating said distant accounting devices to the desired extent subsequent to the adjustment of said primary accounting device.

3. A machine of the character described, comprising a primary accounting device, consisting of a plurality of mechanisms arranged to be preliminarily adjusted as desired, and a distant and structurally separate accounting device consisting of a plurality of mechanisms whose movement is simultaneously controlled in extent by the primary accounting device, with means controlled by a movable part of the primary accounting device for effecting actual movement of the distant accounting device.

4. The combination with a cash register including its operating member, of circuit controlling devices forming part of the cash register mechanism and controlling different circuits for different amounts or designations; a distant accounting device controlled in extent of movement by said circuit controlling devices; and means controlled by said operating member for effecting the actual movement of said accounting device.

5. The combination with a cash register, having an element arranged to be given a differential accounting movement of a distant and structurally separate accounting element arranged to be given a subsequent movement to an extent controlled by the first said element, with means for positively locking said latter element in its adjusted position.

6. The combination with a cash register having an element arranged to be given a differential accounting movement, of a distant and structurally separate accounting element, means for subsequently moving said latter element to an extent corresponding to the movement of said former element, and means for positively locking said latter element when its said corresponding position has been reached.

7. In a machine of the class described, the combination with a cash register, having amount determining elements with means for giving them desired adjustments; of structurally separate accounting elements, a motor having a constant excursion and controlled from the cash register, means whereby said motor simultaneously gives said accounting elements differential movements, and means for restoring said accounting elements to normal position after such differential movement.

8. The combination with a cash register, of circuit controlling devices forming part thereof and controlling different circuits for different amounts; an accounting element arranged to be controlled by said circuit controlling devices; a circuit controller movable with said accounting element; and a magnetic stop device for said element included in said circuits.

9. The combination with a cash register having movable elements, of a distant and structurally separate accounting instrument comprising a plurality of accounting elements, means set in operation by the movable elements of the cash register for simultaneously adjusting said accounting elements to positions determined by a prior adjustment of the movable elements of the cash register, and means for holding said accounting devices in adjusted position.

10. The combination with a cash register, of a recording device having a plurality of recording elements, means for controlling the extent of movement of said elements from movable parts of the cash register, and means for simultaneously setting said elements subsequent to the movement of the movable parts of the cash register.

11. In a machine of the class described, the combination with differentially movable enumerating elements of a recording instrument comprising devices for giving a record, means for subsequently giving said recording devices a movement corresponding to the movement of said enumerating elements and means controlled from the machine for holding the recording devices in adjusted position.

12. In a recording instrument, the combination of a device for giving a record, means for moving said device, a locking means for engaging the device and locking same in any one of a plurality of positions, an electromagnet for controlling said locking means, and a circuit closer operated by said device in its movement, said circuit closer included in the circuit for said electromagnet.

13. The combination with a cash register, of a recording instrument including a device for giving a record, means for moving said device, a locking means for engaging the device and locking the same in any one of a plurality of positions, an electromagnet for controlling said locking means, a circuit closer operated by said device in its movement, said circuit closer included in the circuit for said electromagnet, and a selector for said circuit operated from said cash register.

14. In combination with a cash register having recording devices, of a recording instrument having recording devices, and means for adjusting them to a recording position upon and through the adjustment to a recording position of the recording devices of the cash register.

15. In combination with a recording mechanism, a recording instrument comprising a plurality of devices for recording purposes, means for shifting the devices to a position to give a record, and electromagnetically operated means for controlling the position of said devices, said electromagnetically operated means being controlled from the recording mechanism.

16. In combination with a recording mechanism, a recording instrument comprising a plurality of devices for recording purposes, means for shifting the devices to a position to give a record, electromagnetically operated means for controlling the position of said devices, circuits for the electromagnets of said means, and means for controlling the circuits, which are operated from the recording mechanism and the recording instrument.

17. The combination with a cash register having differentially movable recording devices, of a recording instrument, and means for operating the recording instrument upon an operation of the differentially movable recording devices in the cash register.

18. The combination with a cash register having differentially movable recording devices, of a recording instrument comprising recording devices and electrically controlled means for operating the recording devices, which means are controlled upon an operation of the differentially movable recording devices in the cash register.

19. The combination with a recording mechanism, of a recording instrument comprising devices for giving a record, means for operating and setting said devices differentially, and means controlled from the recording mechanism for controlling the operating and setting means.

20. The combination with a recording mechanism, of a recording instrument comprising devices for giving a record, means for operating said devices differentially, electromagnetically operated means for controlling the said operating means, and means for variably controlling the electromagnets of said electromagnetically operated means from the recording mechanism.

21. The combination with a cash register, of a recording instrument comprising a device for giving a record, means for moving said device differentially from a normal to a recording position, electromagnetically operated means for controlling the position of said record device, a circuit for said electromagnetically operated means, and a circuit selector variably operated from the cash register for controlling the said circuit.

22. The combination with a cash register, of a recording instrument comprising devices for giving a record, means for moving said devices to a record position, electromagnetically operated means for controlling the position of record devices, a circuit for each of the electromagnets of said electromagnetically operated means, and a circuit selector operated from the cash register.

23. The combination with a cash register, of a recording instrument comprising devices for giving a record, means for moving said devices from normal to a recording position, electromagnetically operated means for controlling the position of the recording devices, a plurality of circuits for the electromagnets of said electromagnetically operated means, circuit selectors operated from the cash register, and circuit selectors operated with the record devices for controlling said circuits.

24. In a machine of the class described, the combination with an accounting mechanism comprising devices adapted to be independently adjusted in accordance with characteristics of transactions, of a second accounting mechanism also having devices constructed to be independently adjusted, electrical connections from said first to said second accounting mechanism for controlling the adjustment of the second mechanism according to the position of said first mechanism, and a motor for driving said second mechanism.

25. The combination with a cash register, of a recording instrument comprising devices for giving a record, means for moving said devices to a record position, electromagnetically operated means limiting the movement of the record devices, a circuit for each of the electromagnets of said electromagnetically operated means, circuit selectors operated by the cash register, and means for obtaining a record from said devices, which means are also controlled from the cash register.

26. The combination with a recording mechanism, of a recording instrument comprising a plurality of shafts arranged one within the other, record devices carried by each of said shafts, means for rotating said shafts, and electromagnetically operated means for limiting the movement of such shafts; and circuits for said electromagnetically operated means, which are controlled from the recording mechanism.

27. The combination with a recording mechanism, of a recording instrument comprising a plurality of recording devices, a shaft, a motor for rotating the shaft in one direction, a spring for rotating it in the opposite direction and means operated from the shaft for moving the record devices, which means are controlled from the recording instrument.

28. The combination with a recording mechanism, of a recording instrument, comprising a plurality of shafts arranged one within the other and having independent rotary movement, means for moving each of said shafts, a record device carried by each of said shafts, and electromagnetically operated means for limiting the movement of each of said shafts; and circuits for said electromagnetically operated means which are controlled from the recording mechanism.

29. The combination with a recording mechanism, of a recording instrument comprising a plurality of shafts capable of independent rotation, a record device carried by each of said shafts, a motor for rotating said shafts, and means for limiting the rotation of each of said shafts, said means comprising a toothed segment movable with each shaft and which means are controlled from the recording mechanism.

30. The combination with a recording mechanism, of a recording instrument comprising a plurality of shafts capable of independent rotation, means for rotating each of said shafts, a record device carried by each of said shafts, a toothed segment also carried by each shaft, a lever adapted for engagement with each of said segments and an electromagnet for operating each of said levers; and circuits for said electromagnets which are controlled from the recording mechanism.

31. The combination with a recording mechanism, of a recording instrument comprising a plurality of shafts capable of independent rotation, a recording device carried by each of said shafts, means for rotating each of said shafts, a toothed segment carried by each shaft, electromagnetically operated means co-acting with each of said segments; a plurality of circuits for each of said electromagnetically operated means, and circuit selectors movable with said shaft and by the recording mechanism.

32. The combination of a cash register, a drawer for said cash register, a recording instrument comprising record devices, motor operated means for moving said devices and electromagnetically operated means for controlling the movement of each of the record devices, a plurality of circuits for each of the electromagnets of said electromagnetically operated means, a circuit for the motor, and a circuit controller operated by a movement of the drawer.

33. The combination with a cash register, a drawer for said cash register, a recording instrument comprising record devices, motor operated means for moving said devices, electromagnetically operated means for controlling the motor operated means, and means electrically operated for obtaining a record from the record devices; a plurality of circuits for each of the electromagnets of said electromagnetically operated means and the means for obtaining a record, a circuit for the motor, and circuit controllers for said circuits operated by the movement of the drawer.

34. The combination with a cash register, a drawer for said cash register, of a recording instrument comprising record devices, motor operated means for moving said devices, electromagnetically operated means for controlling the motor operated means and means electrically operated for obtaining a record from the devices; a plurality of circuits for each of the electromagnets of said electromagnetically operated means, circuit selectors operated from the cash register, circuit selectors operated from the record devices, a circuit for the motor and circuit controllers for said circuit of the motor and means for obtaining a record operated by the movement of the drawer.

35. In a machine of the class described, the combination with an accounting mechanism comprising devices arranged to be independently adjusted in accordance with the characteristics of a transaction to be entered in the machine, of a second accounting mechanism also comprising devices arranged to be independently adjusted, but controlled in its adjustment by the adjustment of the first accounting mechanism and means operated subsequently to the adjustment of the first said mechanism and caused to operate thereby to cause commensurate adjustment of the devices of the second said mechanism.

36. In a machine of the class described, the combination with an accounting mechanism comprising devices arranged to be independently adjusted in accordance with the characteristics of a transaction to be entered in the machine, of a second accounting mechanism also comprising devices arranged to be independently adjusted, means governed by the devices of the first said mechanism for controlling the commensurate adjustment of the devices of the second said mechanism, and means caused to operate by the first mechanism to effect such adjustment of the second mechanism.

37. In a machine of the class described, the combination with a cash register including adjustable accounting devices, of additional adjustable accounting devices, means controlled in accordance with the adjustment of the first said devices for limiting the adjustment of the second said devices to an extent commensurate with the adjustment of the first said devices, and means caused to operate by the first devices to effect such adjustment of the second devices.

38. In a machine of the class described, the combination with an accounting mechanism comprising differentially adjustable devices, of a distant accounting mechanism also comprising differentially adjustable devices, electrical connections between said accounting mechanisms for controlling said second mechanism by said first mechanism, a motor for driving said second mechanism, and means for restoring said second mechanism to normal position after operation by said motor.

39. In a machine of the class described, the combination with a cash register including differential printing devices independently adjustable, of auxiliary printing devices also independently differentially adjustable, and means governed by the adjustment of the first said printing devices for controlling the adjustment of the second said printing devices.

40. In a machine of the class described, the combination with a cash register having means for retaining in the machine an entry of transactions, of a distant differentially movable accounting device, and means controlled from the movable parts of the register for causing a commensurate operation of the accounting device subsequent to the adjustment of the register parts.

41. In a cash register, the combination with type carriers of means for taking impressions from same, paper and ribbon carrying and feeding means, pawls carried by said impression means for operating said feeding means, and an electromagnet for operating said impression means.

42. In a machine of the class described, the combination with an accounting mechanism comprising differentially adjustable devices, of a distant accounting mechanism also comprising differentially adjustable devices, electrical connections between said mechanisms wired to control the extent of movement of said second devices in accordance with the position of said first devices, and a motor for driving said second devices, with connections for controlling said motor from said first mechanism.

43. In a machine of the class described, the combination with an accounting mechanism, comprising devices differentially movable in accordance with characteristics of entries in the machine, of a distant accounting mechanism also comprising differentially movable devices, electrical connections from the devices of said first mechanism to said second mechanism for controlling the extent of movement of the devices of said second mechanism, and means set into operation only after the devices of said first mechanism have been adjusted for driving said second mechanism.

44. An accounting machine comprising a plurality of differentially movable elements and an operating mechanism therefor, in combination with a second accounting machine, also comprising a plurality of differentially movable elements, and an operating mechanism therefor, flexible connections between the movable elements of the second accounting machine and its operating mechanism, connections from the movable elements of said first accounting machine for controling the movements of the movable elements of the second accounting machine, and means for controlling the second operating mechanism by the first.

45. In an accounting mechanism, the combination with a differentially movable element, of an operating mechanism therefor, a flexible connection between said element and said operating mechanism, and means controlled from a distance for arresting the differentially movable element in anyone of a plurality of positions.

46. In an accounting mechanism, the combination with a differentially movable element, of a second differentially movable element located at a distance from the first, operating mechanism for each of said elements, means controlled by the operating mechanism for the first mentioned element for placing the operating mechanism for the second mentioned element in operative condition, and means actuated independently of the operating mechanisms for controlling the movement of the second differential element by the first.

47. In an accounting mechanism, the combination with a differentially movable element, of a second differentially movable element located at a distance from the first, operating mechanism for each of said elements, means controlled by the operating mechanism for the first mentioned element for placing the operating mechanism for the second mentioned element in operative condition, and a pawl actuated independently of the operating mechanisms for arresting the movement of the second movable element, with connections whereby the pawl is controlled by the first movable element.

48. In an accounting mechanism, the combination with a set of differentially movable elements, of a second set of differentially movable elements located at a distance from the first set, circuit selectors for each set of movable elements, a cash drawer for operating the elements of the first set, an oscillating motor for operating the elements of the second set, means controlled by the cash drawer for starting the oscillating motor to operate the second set of differentially movable elements, and means including the circuit selectors of both sets of movable elements for arresting the second set when it has moved a distance commensurate with the movement of the first set of movable elements.

49. In an accounting mechanism, the combination with a set of differentially movable recording devices, of a second set of differentially movable recording devices located at a distance from the first set, circuit selectors for each set of recording devices, a movable element for controlling the operation of the first set of recording devices, a motor controlled by the said movable element for controlling the recording devices of the second set, means including the circuit selectors of both sets of recording devices for arresting the second set when it has moved a distance commensurate with the movement of the first set of recording devices, and means controlled by the movable element for taking an impression from the recording devices of both sets.

50. In an accounting mechanism, the combination with a set of differentially movable recording devices, of a second set of differentially movable recording devices located at a distance from the first set, electrical circuits between said sets, circuit selectors for each set of recording devices, a movable element for controlling the operation of the first set of recording devices, a motor controlled by the said movable element for controlling the recording devices of the second set, pawls for arresting the second set of recording devices when they have moved a distance commensurate with the movement of the recording devices of the first set, magnets common to the various circuits formed by the circuit selectors for operating the pawls to arrest the recording devices of the second set, and means controlled by the movable element for taking an impression from the recording devices of both sets.

51. In a machine of the class described, the combination with a cash register having elements constructed to be moved differentially from normal position upon an operation of the cash register, of a distant and structurally separate accounting mechanism consisting of a plurality of differentially movable elements, means for controlling the movements of the accounting mechanism elements by the cash register elements, and locking means, controlled by the elements of the cash register, for preventing movement of the elements of the accounting mechanism until the first mentioned elements are moved.

52. In a machine of the class described, the combination with a cash register having differentially movable elements, of a distant and structurally separate accounting mechanism consisting of a plurality of differentially movable elements, means for controlling the accounting mechanism elements by the corresponding cash register elements, and magnetically controlled locking devices for the elements of the distant accounting mechanism which also are controlled by the elements of the cash register.

53. In a machine of the class described, the combination with a cash register having differentially movable elements and an operating mechanism, of a distant and structurally separate accounting mechanism having differentially moving elements and an invariably movable operating mechanism therefor, connections for controlling the latter operating mechanism by the operating mechanism of the cash register, means, controlled by the elements of the cash register, for determining the movement of the elements of the accounting mechanism, and flexible connections between the operating mechanism of the accounting mechanism and the elements actuated thereby.

54. In a machine of the class described, the combination with a cash register having differentially movable elements and an operating mechanism, of a distant and structurally separate accounting mechanism having differentially movable type carriers and an invariably movable operating mechanism therefor, connections for controlling the latter operating mechanism by the operating mechanism of the cash register, means, controlled by the elements of the cash register, for determining the movement of the type carriers of the accounting mechanism and a platen, for taking an impression from the type carriers upon a record strip, also controlled by the operating mechanism of the cash register.

In testimony whereof, I have signed my name in the presence of two subscribing witnesses.

THEODORE M. FOOTE.

Witnesses:
GEO. E. CRUSE,
M. J. MACKAYE.

It is hereby certified that in Letters Patent No. 997,983, granted July 18, 1911, upon the application of Theodore M. Foote, of New York, N. Y., for an improvement in "Recording Devices," errors appear in the printed specification requiring correction as follows: Page 7, line 68, after the word "devices" insert *differentially;* and same page, line 73, after the word "selector" insert the word *variably;* and that the said Letters Patent should be read with these corrections therein that the same may conform to the record of the case in the Patent Office.

Signed and sealed this 12th day of September, A. D., 1911.

[SEAL.]

E. B. MOORE,